(12) United States Patent
Thomas

(10) Patent No.: US 7,374,205 B2
(45) Date of Patent: May 20, 2008

(54) AIR BAG SYSTEM

(75) Inventor: Scott D. Thomas, Novi, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 12 days.

(21) Appl. No.: 11/358,231

(22) Filed: Feb. 21, 2006

(65) Prior Publication Data

US 2007/0194561 A1   Aug. 23, 2007

(51) Int. Cl.
*B60R 21/22* (2006.01)

(52) U.S. Cl. .................................. 280/743.2

(58) Field of Classification Search ............. 280/743.2, 280/743.1
See application file for complete search history.

(56) References Cited

U.S. PATENT DOCUMENTS

| | | | | |
|---|---|---|---|---|
| 6,082,765 | A | 7/2000 | Bowers et al. | 280/742 |
| 6,390,501 | B1 | 5/2002 | Greib et al. | 280/743.2 |
| 6,454,300 | B1 | 9/2002 | Dunkle et al. | 280/742 |
| 6,511,094 | B2 | 1/2003 | Thomas et al. | 280/743.2 |
| 6,561,545 | B2 | 5/2003 | Greib et al. | 280/743.2 |
| 6,808,205 | B2 * | 10/2004 | Hawthorn et al. | 280/743.2 |
| 2004/0051285 | A1 | 3/2004 | Fischer | 280/739 |
| 2004/0051286 | A1 | 3/2004 | Fischer et al. | 280/739 |
| 2004/0232677 | A1 | 11/2004 | Fischer et al. | 280/739 |
| 2005/0040634 | A1 | 2/2005 | Braun et al. | 280/742 |
| 2005/0127648 | A1 | 6/2005 | Fischer et al. | 280/739 |
| 2005/0146122 | A1 | 7/2005 | Gould et al. | 280/739 |
| 2006/0284404 | A1 * | 12/2006 | Green et al. | 280/743.2 |

* cited by examiner

*Primary Examiner*—Faye M. Fleming

(57) ABSTRACT

An air bag system includes an inflator operable to inflate an inflatable air bag housed within an air bag housing. A tether extends from the air bag through the housing. A mechanism operatively connected to the housing selectively retains the tether. The mechanism includes a movable member selectively movable from a first position to a second position, with movement of the movable member to the second position breaking the tether, thereby detaching the tether from the mechanism. The air bag inflates to a first profile when the mechanism retains the tether and to a second profile when the tether is detached. The air bag system may include a cutting element, with movement of the movable member causing the cutting element to slice through the tether. The mechanism may include an actuator operable to release actuation fluid, with the released fluid breaking the tether to detach the tether from the mechanism.

17 Claims, 5 Drawing Sheets

AIR BAG SYSTEM

TECHNICAL FIELD

This invention relates to air bag systems, and more particularly to an air bag system having a mechanism to cut or otherwise damage an air bag tether to allow inflation of an air bag to varying depths.

BACKGROUND OF THE INVENTION

Air bag systems in automotive vehicles generally include an air bag that is designed to deploy toward a seat or seating location of the automotive vehicle when triggered by a sensor signal. For example, air bag systems might be deployed upon sudden deceleration of a vehicle or upon impact of the vehicle with another object. The art continues to investigate alternative ways to deploy air bags. For example, accelerometers have been investigated to determine when a sensor signal should signal the deployment of an air bag. Inflator assemblies have been developed to control how much gas is emitted into an air bag upon deployment.

SUMMARY OF THE INVENTION

The present invention provides an air bag system including an inflator operable to inflate an inflatable air bag housed within an air bag housing. A flexible sensing tether extends from the air bag through the housing. A mechanism operatively connected to the housing selectively retains the tether. The mechanism includes a movable member selectively movable from a first position to a second position, with movement of the movable member to the second position damaging the tether, thereby detaching the tether from the mechanism. The air bag inflates to a first profile when the mechanism retains the tether and to a second profile when the tether is broken and detached. Preferably, the second profile is deeper than the first profile. The housing may define a vent, with the movable member blocking the vent when in one of the first and second positions and unblocking the vent when in the other of the first and second positions.

In one aspect of the invention, the mechanism further includes a cutting element, with movement of the movable member causing the cutting element to slice through the tether. The cutting element may be disposed on the movable member, such that movement of the movable member from the first position to the second position moves the cutting element along the tether, thereby slicing therethrough. The mechanism may include a tether protecting element disposed between the tether and the cutting element when the movable member is in the first position, with movement of the movable member to the second position causing the cutting element to slice through the tether protecting element and the tether.

In another aspect of the invention, the tether includes a tether loop, with the mechanism selectively retaining the tether loop to selectively retain the tether. Movement of the movable member to the second position may damage the tether at the tether loop, or remote therefrom. The mechanism may further include a rod extending through the tether loop to retain the tether.

In still another aspect of the present invention, the movable member at least partially defines a pressurizable chamber. The mechanism further includes an actuator operable to selectively release actuation fluid into the pressurizable chamber to move the movable member from the first position to the second position. The mechanism may further include a piston housing at least partially defining the pressurizable chamber, with the movable member preferably extending into the piston housing. A tether protector may extend through both the piston housing and the movable member, with the tether extending through the tether protector, such that movement of the movable member from the first position to the second position cuts both the tether protector and the tether.

In a further aspect of the present invention, the tether may extend around the piston housing, with the piston housing selectively retaining the tether. The piston housing may define a slot, with the movable member blocking the slot when in the first position. Preferably, the tether is disposed adjacent the slot, such that movement of the movable member to the second position unblocks the slot and allows actuation fluid to damage the tether until the tether fractures, thereby detaching the tether from the mechanism. A cutting element may extend into the slot, such that actuation fluid pushes the tether into the cutting element when the movable member is not blocking the slot.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
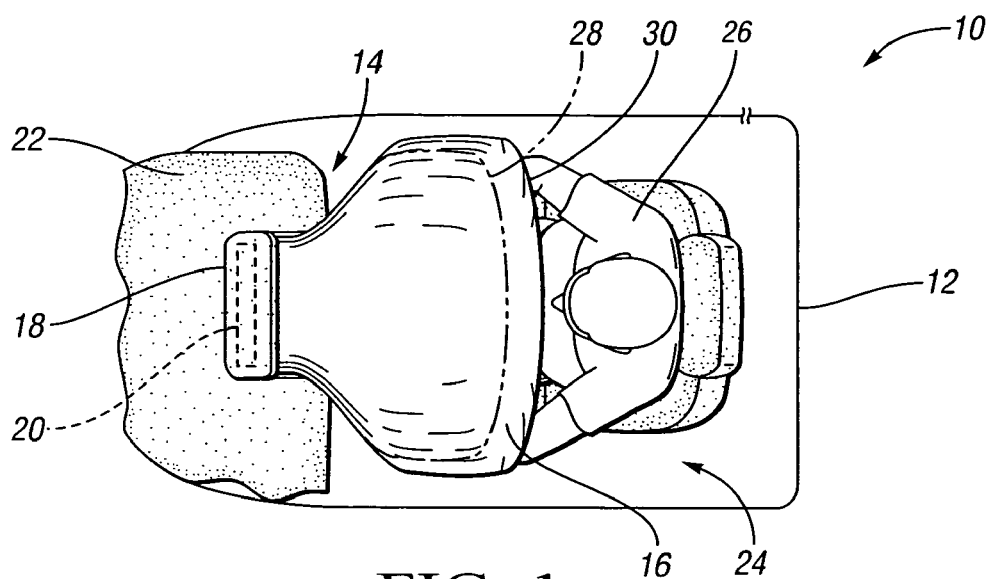
FIG. 1 is schematic plan view of an air bag system mounted within a vehicle.

Referring to the drawings, wherein like reference numbers refer to like components, FIG. 1 shows a vehicle 10 having a vehicle body 12. An air bag system 14 is mounted to the vehicle 10. The air bag system 14 includes an air bag 16 initially housed within an air bag housing 18. An inflator 20 is mounted to the housing 18. The housing 18 is mounted within an instrument panel 22, although it may be mounted elsewhere on the vehicle 10 within the scope of the invention. The air bag 16 is selectively deployable into an interior space 24 toward an occupant 26 upon release of inflation gas by the inflator 20. The air bag 16 is inflatable when deployed to either a shallow first profile 28, shown in phantom in FIG. 1, or a deeper second profile 30. Sensors (not shown) mounted to the vehicle 10 may be connected in signaling communication with the inflator 20, as known to those skilled in the art. Under certain sensed conditions, the sensors signal the inflator.

Figure 2:
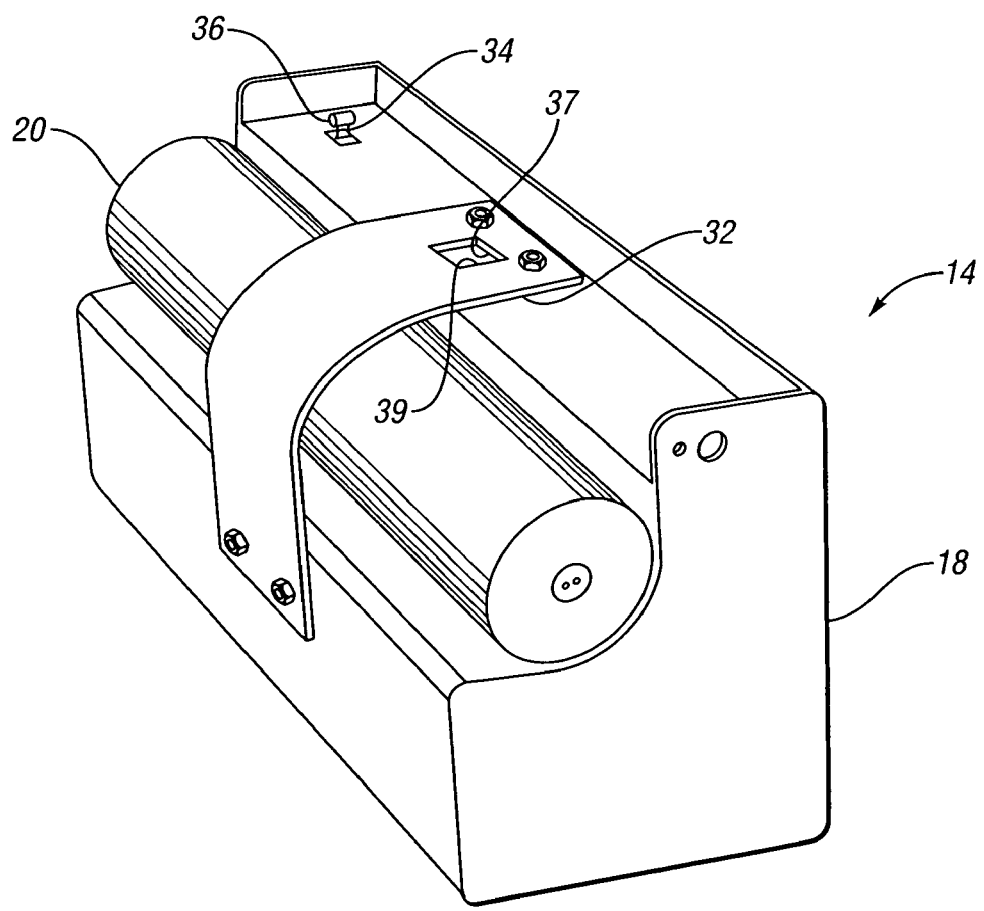
FIG. 2 is a schematic perspective view of the air bag system of FIG. 1.

Referring now to FIG. 2, the air bag system 14 is shown in greater detail. The air bag 16 of FIG. 1 is housed within the air bag housing 18. In FIG. 2, the inflator 20 is schematically shown mounted outside of the housing 18. However, one skilled in the art should appreciate that the inflator 20 could be mounted inside of the housing 18 without changing the inventive concept. A retention plate 32 attaches to the housing 18 to secure the inflator 20 in an appropriate position. A tether 34 preferably including a tether loop 36 extends through the housing 18 such that the tether loop 36 is disposed outside of the housing 18. The tether 34 attaches to the air bag 16 of FIG. 1 within the housing 18, and generally restricts inflation of the air bag 16 to the first profile 28 when the tether loop 36 is retained by a portion of the air bag system 14 as described herein. If the tether 34 breaks, thereby detaching it from the air bag system 14, the air bag 16 is free to inflate to the second profile 30. The housing 18 preferably includes a vent 37, with a corresponding opening 39 defined by the retention plate 32, thereby allowing gas to escape from within the housing through the openings 37, 39.

Figure 3:
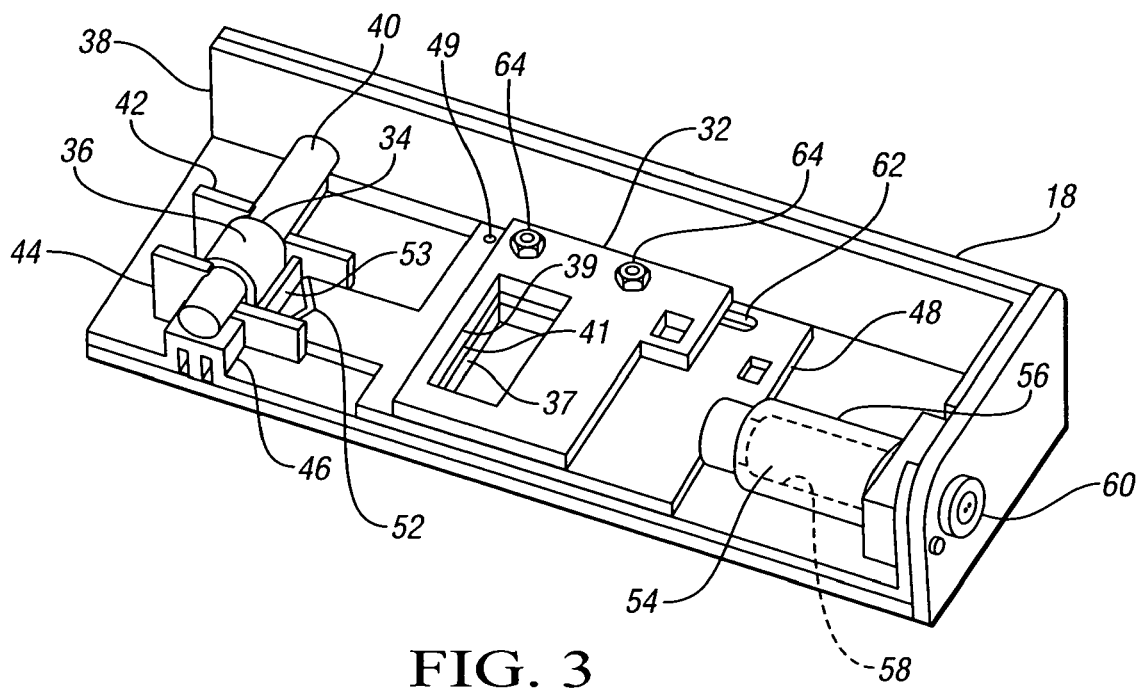
FIG. 3 is a schematic perspective view of a portion of an air bag housing from the air bag system of FIG. 2 showing a movable member in a first position.
Figure 4:
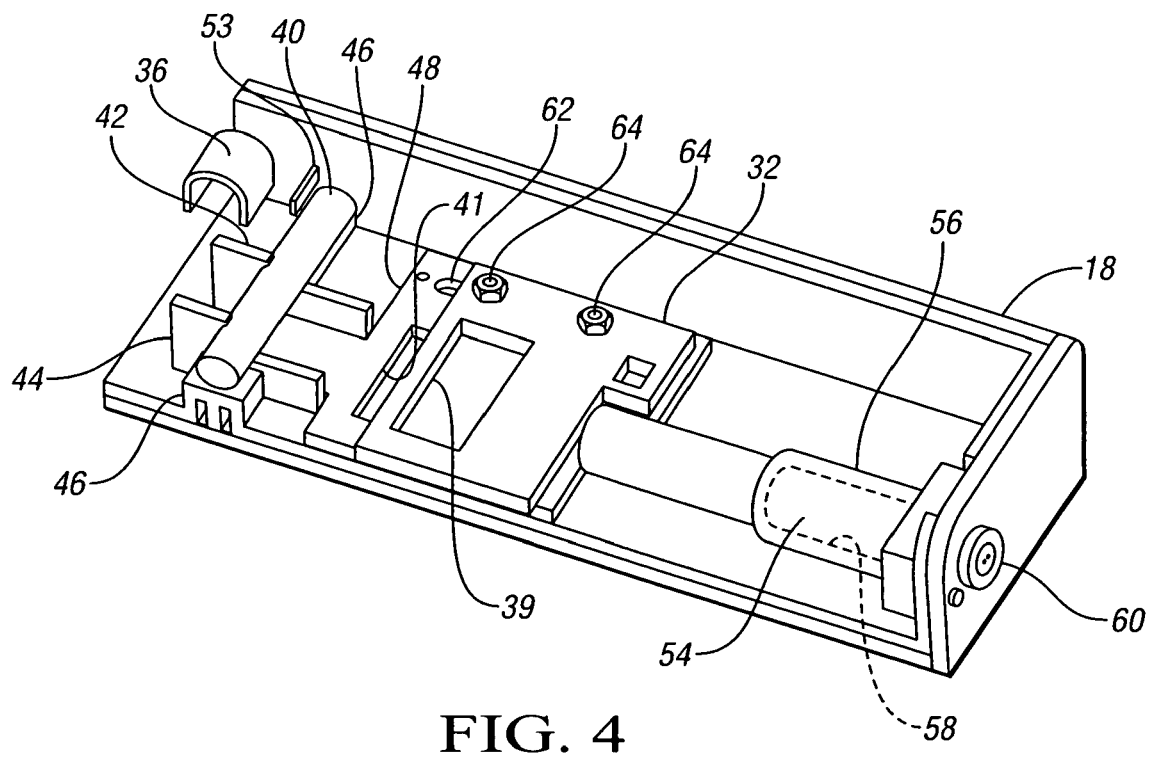
FIG. 4 is a schematic perspective view of the portion of the air bag housing of FIG. 3 showing the movable member in a second position.

FIG. 3 shows a portion of an exterior of an air bag housing 18, with an optional mechanism housing 38 thereatop. The tether 34 extends through the mechanism housing 38, with a rod 40 extending through the tether loop 36 and resting within retention members 42, 44 to retain the tether loop 36. The housing 38 may include ledges 46 which further support the rod 40. A movable member 48 is disposed between the mechanism housing 38 and the retention plate 32, with the movable member 48 defining an opening 41. The movable member 48 preferably includes a cutting element 52. While the cutting element 52 shown in FIG. 3 is a V-shaped member disposed atop the movable member 48, it should be appreciated that any cutting element can be utilized within the scope of the present invention. A sacrificial tether protecting element 53 is disposed between the cutting element 52 and the tether 34 and/or the tether loop 36. The sacrificial tether protecting element 53 can be a frangible wall as shown in FIG. 3, a frangible sleeve surrounding the tether 34, a frangible cover covering the cutting element 52, or any other element which initially protects the tether 34 from the cutting element 52. A piston 54 extends from the movable member 48, and seats within a piston housing 56. Preferably a plug (not shown) is disposed within the piston housing 56 on an end of the piston 54. The piston 54 is movable from an undeployed state, as shown in FIG. 3, to a deployed state, as shown in FIG. 4. Preferably, the piston 54 and the piston housing 56 define a pressurizable chamber 58 into which an actuator 60 extends.

The actuator 60 releases actuation fluid into the pressurizable chamber 58 upon detection of sensed conditions. One such actuator 60 is a pyrotechnic device, such as a container of solid propellant, wherein the propellant is conventionally ignited by an electric signal, such as a signal from an electronic controller, to actuate the actuator 60. Upon actuation, pressure builds within the pressurizable chamber 58 to move the piston 54 from the undeployed state to the deployed state. Another type of actuator 60 is a solenoid. One skilled in the art will recognize the different types of actuators which may be used. The conditions causing deployment of the actuator 60 may include impact speed, weight of the occupant, sensed seat or occupant position, seatbelt usage, etc. It should be noted that the actuator 60 could be disposed elsewhere within the scope of the present invention.

Since the piston 54 extends from the movable member 48, movement of the piston 54 from the undeployed state to the deployed state moves the movable member 48 from a first position (shown in FIG. 3) to a second position (shown in FIG. 4). Preferably, a pin 49 extends through the movable member 48 when the movable member 48 is in the first position, such that the pin 49 retains the movable member in the first position. As the piston 54 moves from the undeployed state to the deployed state, the pin 49 is fractured or otherwise removed, thereby allowing the movable member to move to the second position. As the movable member 48 moves to the second position, the cutting element 52 cuts the tether protecting element 53 and the tether loop 36, thereby detaching the tether 34 from the rod 40 and allowing inflation of the air bag of FIG. 1 to the second profile 30. It should be noted that inflation fluid released by the inflator 20 could be utilized to move the movable member 48 from the first position to the second position, either in addition to movement caused by a build-up of actuation fluid, or as an alternative. It should also be noted that while this embodiment of the invention shows a movable cutting element 52 moving into a relatively stationary tether 34, a stationary cutting element may be utilized, or both the cutting element and the tether may be movable, within the scope of the present invention.

Additionally, when the piston 54 is in the undeployed state, and thus the movable member 48 is in the first position, the openings 37, 39, 41 defined by the housing 18, the retention plate 32, and the movable member 48, respectively, are aligned, thereby allowing fluid to flow from within the housing 18 to the outside environment. However, movement of the piston 54 to the second position moves the opening 41 within the movable member 48 out of alignment with the other openings 37, 39, thereby disallowing at least a portion of the fluid flow from within the housing 18. The housing 18, the retention plate 32, and the movable member 48 may also include openings that are misaligned when the movable member 48 is in the first position, with the openings aligning when the movable member 48 is in the second position. Thus it can be seen that movement of the movable member 48 from the first position to the second position can either open or close vents within the air bag system 14.

The movable member 48 preferably defines slots 62, with the slots sliding around fasteners 64 used to secure the retention plate 32 to the housing 18 during movement from the first position to the second position. The slots 62 act as a travel stop for the movable member 48, and may be configured to wedge around the fasteners 64 to retain the movable member 48 in the second position.

Figure 5:
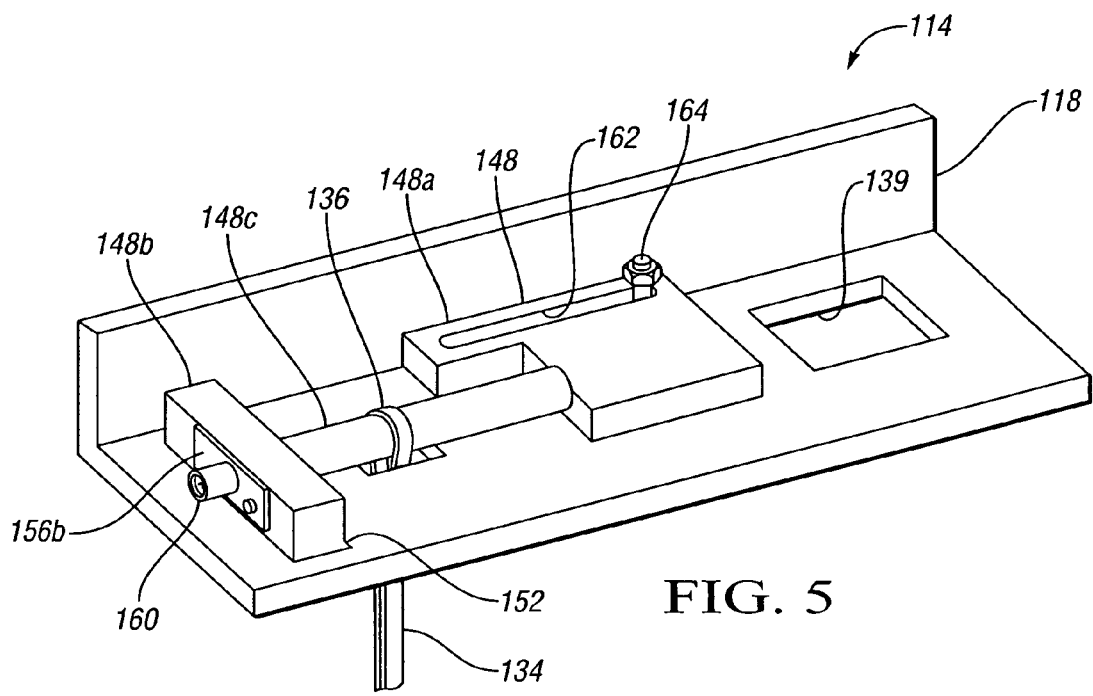
FIG. 5 is a schematic perspective view of a portion of an air bag housing of a second embodiment of an air bag system according to the present invention.
Figure 6:
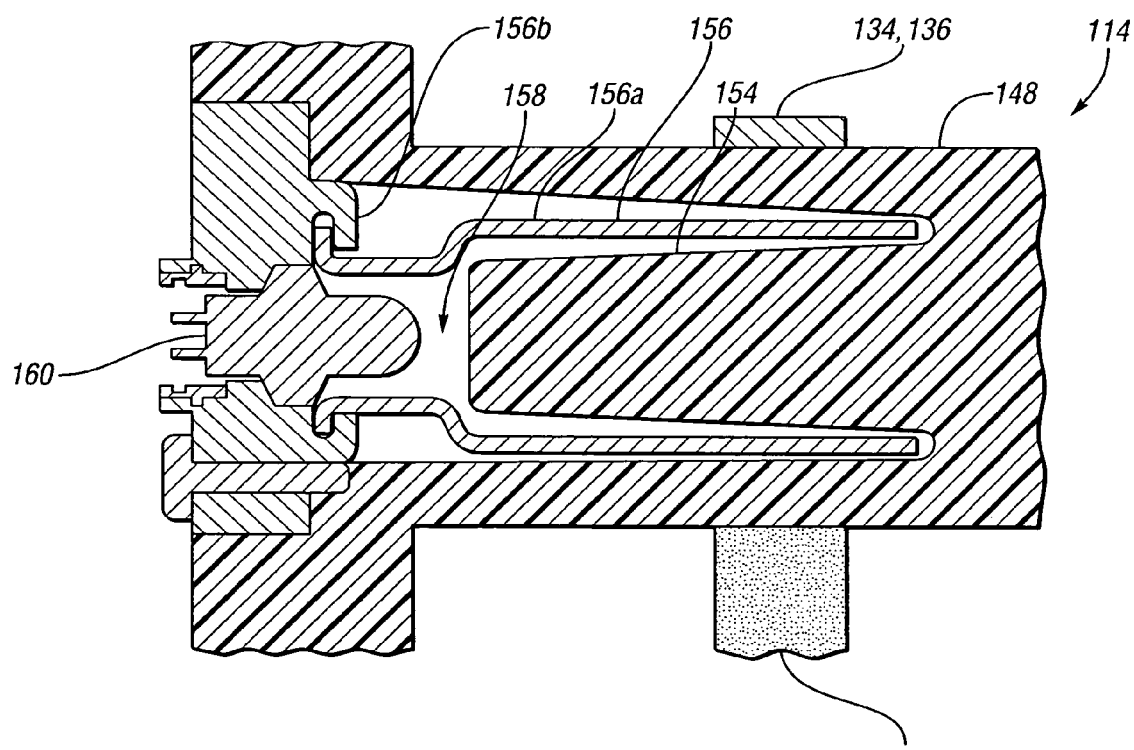
FIG. 6 is a schematic cross-sectional view of the portion of the air bag housing of FIG. 5.

FIGS. 5 and 6 illustrate a second embodiment of an air bag system 114 according to the present invention. As shown in FIG. 5, an air bag housing 118 includes a movable member 148 having a plate 148a and a base 148b with a rod 148c extending therebetween. A tether 134 having a tether loop 136 extends through the air bag housing 118, and routes around the rod 148c of the movable member 148. As best seen in FIG. 6, a piston housing 156 preferably includes a formed tube 156a attached to a retention member 156b to at least partially define a pressurizable chamber 158. In the preferred embodiment, the retention member 156b is a cold headed slug. A piston 154 extends from the movable member 148 and seats within the formed tube 156a, also at least partially defining the pressurizable chamber 158, while an actuator 160 seats within the retention member 156b. The piston 154 is movable from an undeployed state as shown in FIGS. 5 and 6, to a deployed state (not shown), wherein the piston 154 moves rightward with respect to FIGS. 5 and 6, upon release of actuation fluid by the actuator 160 into the pressurizable chamber 158. Movement of the piston 154 also moves the movable member 148 to the right. The base 148b of the movable member 148 preferably includes a cutting element 152, such that movement of the movable member 148 causes the cutting element 152 to cut the tether 134 as it passes thereby. The cutting element 152 can be a blade edge, as shown in FIG. 5, or any other cutting element. Preferably, the movable member 148 defines a slot 162, with the slot 162 sliding around a fastener 164 during deployment of the piston 154, such that the slot 162 acts as a travel stop for the movable member 148. Additionally, the movable member 148 may be configured to block an opening 139 within the air bag housing 118 when in the deployed state.

Figure 7:
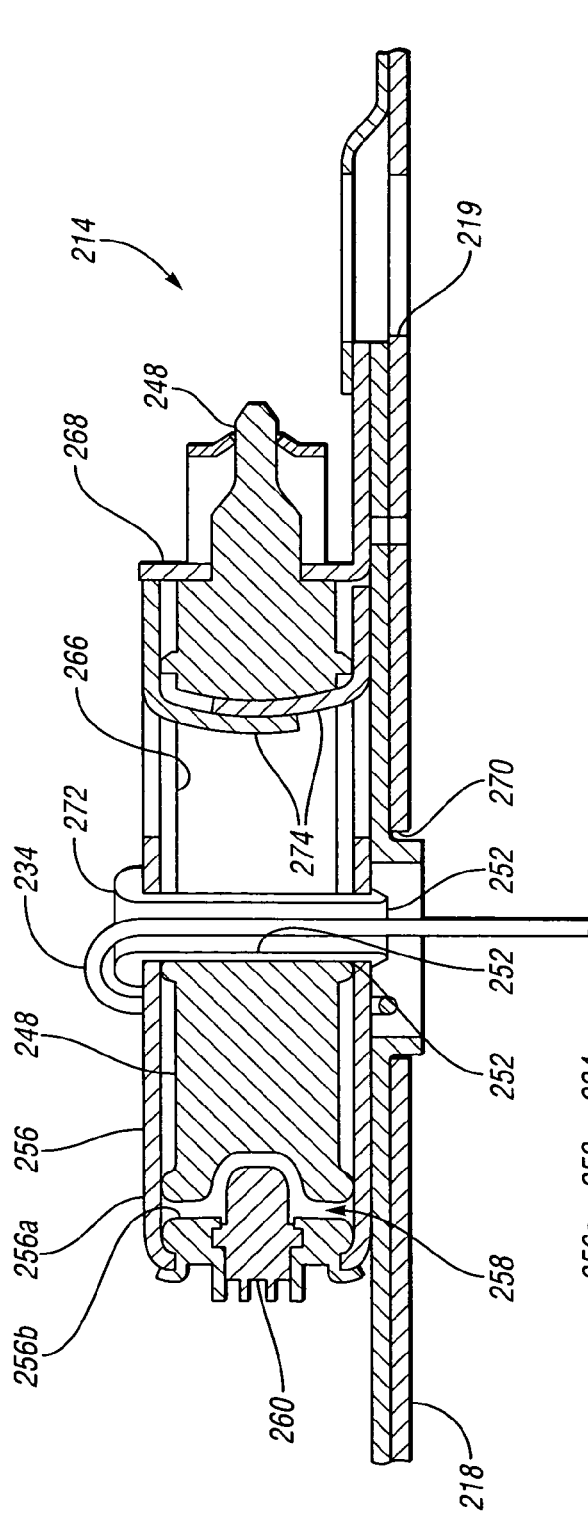
FIG. 7 is a schematic cross-sectional view of a portion of an air bag housing of a third embodiment of an air bag system according to the present invention showing a movable member in a first position.
Figure 8:
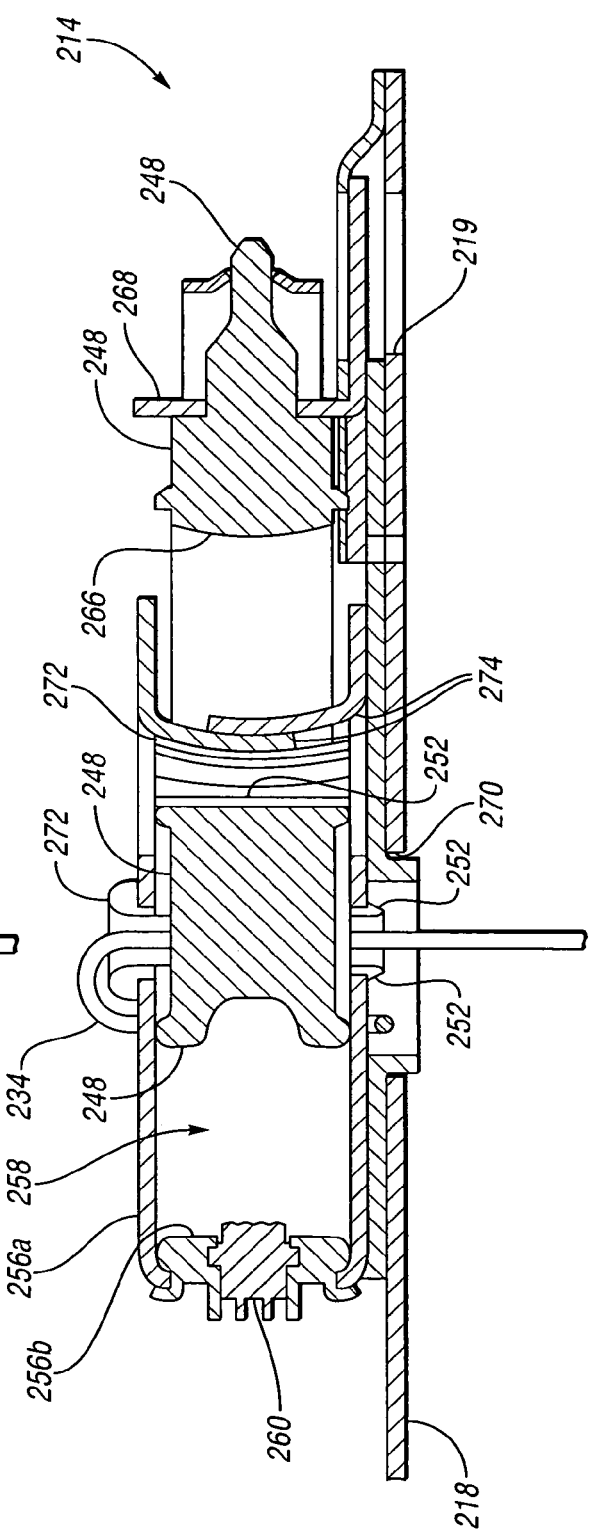
FIG. 8 is a schematic cross-sectional view of the portion of the air bag system of FIG. 7 showing the movable member in a second position.

FIGS. 7 and 8 illustrate a third embodiment of an air bag system 214 according to the present invention. An air bag housing 218 defining openings 219, 270 has a movable member 248 coupled thereto. The movable member 248 defines a slot 266. The movable member 248 is preferably formed by plastic injection molding, perhaps with embedded glass fibers, although any suitable material may be used. A vent blocker 268 is press-fit or otherwise attached to the end of the movable member 248. A piston housing 256 preferably includes a formed tube 256a attached to a retention member 256b to at least partially define a pressurizable chamber 258. The movable member 248 seats within the formed tube 256a and also at least partially defines the pressurizable chamber 258, while an actuator 260 seats within the retention member 256b. A tether protector 272 extends through the piston housing 256 and seats within the slot 266 of the movable member 248. A tether 234 routes from within the air bag housing 218 up through the tether protector 272, and preferably wraps around the formed tube 256a. Actuation of the actuator 260 moves the movable member 248 from a first position, shown in FIG. 7, to a second position, shown in FIG. 8. The tether protector 272 retains the movable member 248 in the first position. Tabs 274 extend from the piston housing 256 and act as a travel stop for the movable member 248. One or more cutting elements 252 are configured to cut the tether 234 and the tether protector 272 as the movable member 248 moves to the second position, thereby breaking the tether 234 to detach the tether 234 from the air bag system. Additionally, movement of the movable member 248 to the second position causes the vent blocker 268 to cover the opening 219 within the air bag housing 218.

Figure 9:
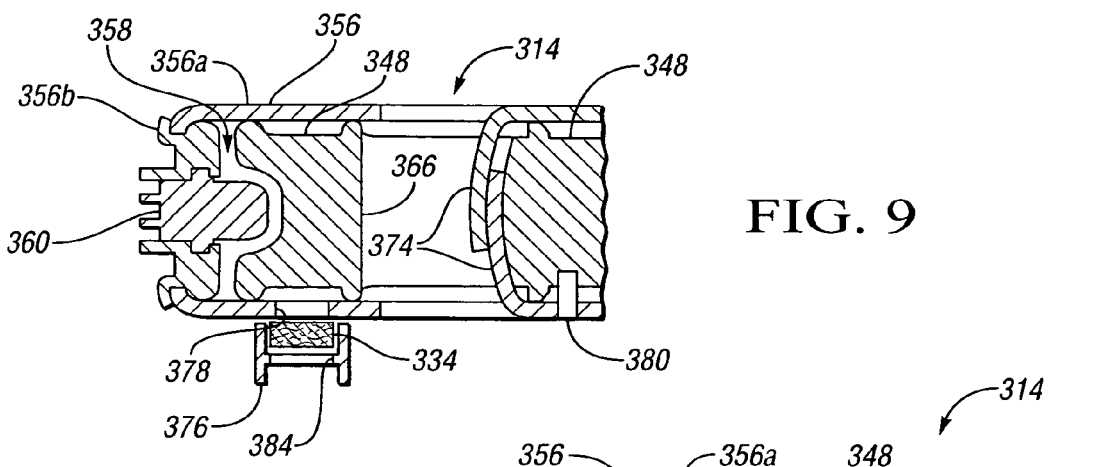
FIG. 9 is a schematic cross-sectional view of a portion of an air bag housing of a fourth embodiment of an air bag system according to the present invention showing a movable member in a first position.
Figure 10:
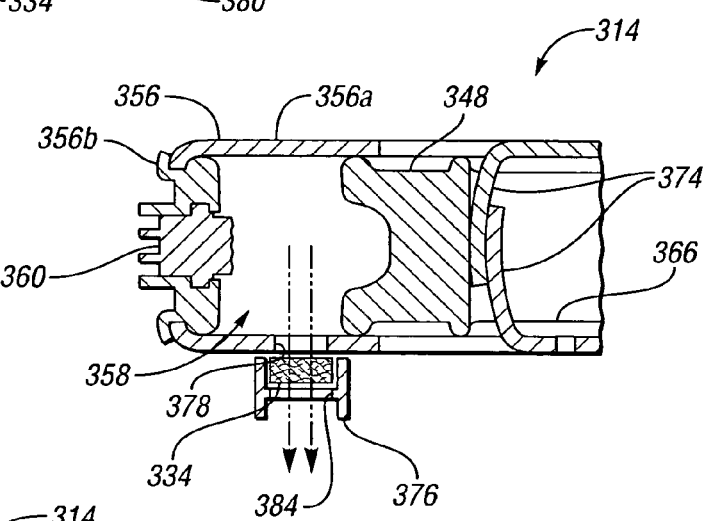
FIG. 10 is a schematic cross-sectional view of the portion of the air bag housing of FIG. 9 showing the movable member in a second position.

FIGS. 9 and 10 show a portion of a fourth embodiment of an air bag system 314 according to the present invention. An air bag housing such as the air bag housing 18 of FIG. 1 has a movable member 348 coupled thereto. The movable member 348 defines a slot 366. A piston housing 356 preferably includes a formed tube 356a attached to a retention member 356b to at least partially define a pressurizable chamber 358. The movable member 348 seats within the formed tube 356a and also at least partially defines the pressurizable chamber 358. An actuator 360 seats within the retention member 356b. A tether 334 is disposed adjacent a slot 378 defined by the piston housing 356, with a reaction member 376 maintaining the position of the tether 334. A pin 380 extends through the movable member 348 and the housing 318 to retain the movable member 348 in a first position, shown in FIG. 9. Upon actuation of the actuator 360, the movable member 348 moves from the first position to a second position, shown in FIG. 10. Preferably, the movable member 348 fractures the pin 380 during movement from the first position to the second position. Alternatively, the pin 380 may be removed prior to movement of the movable member 348, i.e., if an air bag (not shown) inflates beyond a predetermined depth. Tabs 374 extend from the piston housing 356 and act as a travel stop for the movable member 348.

When the movable member 348 is in the first position, the movable member 348 blocks the slot 378 defined by the piston housing 356. However, when the movable member 348 is in the second position, the slot 378 is unblocked, such that actuation fluid built up within the pressurizable chamber 358 can exit therethrough, as indicated by arrows in FIG. 10. Since the reaction member 376 holds the tether 334 adjacent the slot 378, the actuation fluid and any associated particulates melt, cut or shear the tether 334, thereby breaking the tether 334 to detach the tether 334 from the air bag system 314. It should be noted that the slot 378 may be oriented elsewhere within the air bag system 314 within the scope of the present invention. For example, the slot 378 could be positioned to allow actuation fluid/particulates to shear the tether 334 prior to movement of the movable member 348 from the first position to the second position.

Figure 11:
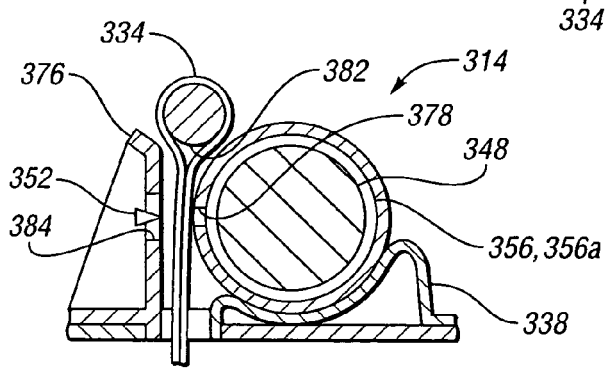
FIG. 11 is a schematic cross-sectional view of the portion of the air bag housing of FIG. 9 with the movable member in the first position.
Figure 13:
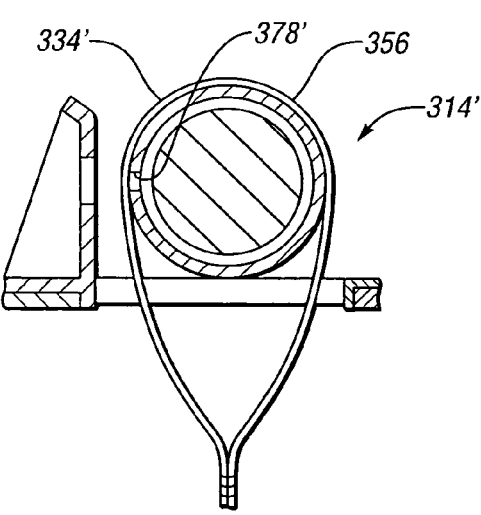
FIG. 13 is a schematic cross-sectional view of a variation to the portion of the air bag housing of FIG. 9.
Figure 12:
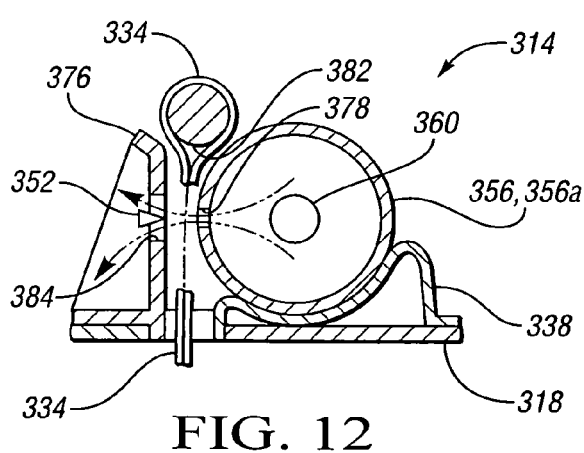
FIG. 12 is a schematic cross-sectional view of the portion of the air bag housing of FIG. 9 with the movable member in the second position.

FIG. 11 shows a cross-section of the fourth embodiment of the air bag system 314, with the movable member in the first position and prior to shearing of the tether 334. As shown, the movable member 348 is disposed within the piston housing 356 atop a mechanism housing 338. The tether 334 loops around a rod 382, with the reaction member 376, the piston housing 356, and the rod 382 maintaining the position of the tether 334 adjacent the slot 378. Additionally, a cutting element 352 is disposed within a vent 384 defined by the reaction member 376. While the air bag system 314 may be configured such that the actuation fluid/particulates alone will fracture and detach the tether 334, the present invention also contemplates using the actuation fluid to push the tether 334 into the cutting element 352, thereby breaking and detaching the tether 334. FIG. 12 shows a cross-section of the fourth embodiment of the air bag system 314, with the movable member in the second position. The actuation fluid/particulates, indicated by arrows in FIG. 10, have broken and detached the tether 334, either directly or by pushing the tether 334 into the cutting element 352, and vented through the vent 384. FIG. 13 shows a variation of the fourth embodiment of the air bag system 314'. Particularly, the tether 334' loops around the formed tube 356a', such that the tether 334' is immediately adjacent the slot 378'.

While the best modes for carrying out the invention have been described in detail, it is to be understood that the terminology used is intended to be in the nature of words and description rather than of limitation. Those familiar with the art to which this invention relates will recognize that many modifications of the present invention are possible in light of the above teachings. It is, therefore, to be understood that within the scope of the appended claims, the invention may be practiced in a substantially equivalent way other than as specifically described herein.

The invention claimed is:

1. An air bag system comprising:
an inflator operable to release inflation fluid;
an inflatable air bag, said air bag being inflatable upon release of inflation fluid from said inflator;
an air bag housing substantially surrounding said air bag;
a tether extending from said air bag through said housing, wherein said tether includes a tether loop; and
a mechanism operatively connected to said housing and selectively retaining said tether loop to thereby selectively retain said tether, said mechanism including:
a movable member selectively movable from a first position to a second position to thereby break said tether and thereby detach said tether loop from said mechanism; and
a sacrificial tether protecting element disposed between said tether and said moveable member for protecting said tether from said moveable member while said moveable member is in said first position;
wherein said air bag inflates to a first profile when said mechanism retains said tether and to a second profile when said tether loop is detached from said mechanism.

2. The air bag system of claim 1, wherein said mechanism further includes a cutting element, and wherein movement of said movable member from said first position to said second position causes said cutting element to slice through said sacrificial tether protecting element and said tether loop, thereby breaking said sacrificial tether protecting element and said tether to detach said tether loop from said mechanism.

3. The air bag system of claim 2, wherein said cutting element is disposed on said movable member, such that movement of said movable member from said first position to said second position moves said cutting member into contact with said tether loop.

4. The air bag system of claim 3, wherein movement of said movable member from said first position to said second position cuts said tether at said tether loop.

5. The air bag system of claim 3, wherein movement of said movable member from said first position to said second position cuts said tether remote from said tether loop, such that following movement of said movable member to said second position, said tether detaches from said mechanism while said mechanism retains said tether loop.

6. The air bag system of claim 3, wherein said mechanism further includes a rod, and wherein said rod extends through said tether loop to retain said tether.

7. The air bag system of claim 1, wherein said movable member at least partially defines a pressurizable chamber, and wherein said mechanism further comprises an actuator operable to selectively release actuation fluid into said pressurizable chamber, thereby pressurizing said pressurizable chamber to move said movable member from said first position to said second position.

8. The air bag system of claim 1, wherein said mechanism further comprises:
a piston housing at least partially defining a pressurizable chamber, said movable member extending into said piston housing and at least partially defining said pressurizable chamber; and
an actuator operable to selectively release actuation fluid into said pressurizable chamber, thereby pressurizing said pressurizable chamber to move said movable member from said first position to said second position.

9. The air bag system of claim 8, wherein said tether extends around said piston housing, such that said piston housing selectively retains said tether.

10. The air bag system of claim 8, wherein said piston housing defines a slot, said movable member blocking said slot when in said first position, and wherein said tether is disposed adjacent said slot, such that movement of said movable member to said second position unblocks said slot and allows actuation fluid to damage said tether until said tether fractures, thereby breaking said tether to detach said tether from said mechanism and allowing inflation of said air bag to said second profile.

11. The air bag system of claim 8, wherein said piston housing defines a slot and said mechanism further includes a cutting element, said movable member blocking said slot when in said first position, and wherein said tether is disposed adjacent said slot, such that movement of said movable member to said second position unblocks said slot and allows actuation fluid to push said tether into said cutting element until said cutting element cuts said tether, thereby breaking said tether to detach said tether from said mechanism and allowing inflation of said air bag to said second profile.

12. The air bag system of claim 1, wherein said second profile is deeper than said first profile.

13. The air bag system of claim 1, wherein said housing defines a vent, said movable member blocking said vent when in said first position, and wherein movement of said movable member from said first position to said second position unblocks said vent.

14. The air bag system of claim 1, wherein said housing defines a vent, said movable member allowing fluid flow through said vent when in said first position, and wherein movement of said movable member from said first position to said second position blocks said vent.

15. The air bag system of claim 1, wherein inflation fluid released by said inflator at least partially moves said movable member from said first position to said second position.

16. An air bag system comprising:
an inflator operable to release inflation fluid;
an inflatable air bag, said air bag being inflatable upon release of inflation fluid from said inflator;
an air bag housing substantially surrounding said air bag;
a tether extending from said air bag through said housing, wherein said tether includes a tether loop; and
a mechanism operatively connected to said housing and operable to thereby selectively retain said tether, wherein said mechanism includes:
a movable member selectively movable from a first position to a second position;
a sacrificial tether protecting element; and
a cutting element operable to cut said tether and said sacrificial tether protecting element as said movable member moves from said first position to said second position;
wherein said sacrificial tether protecting element is disposed between said tether and said cutting element when said movable member is in said first position, and wherein movement of said movable member from said first position to said second position causes said cutting element to cut said sacrificial tether protecting element and said tether, thereby breaking said tether to detach said tether from said mechanism;

wherein said air bag inflates to a first profile when said mechanism retains said tether and to a second profile when said tether is detached from said mechanism.

17. An air bag system comprising:
an inflator operable to release inflation fluid;
an inflatable air bag, said air bag being inflatable upon release of inflation fluid from said inflator;
an air bag housing substantially surrounding said air bag;
a tether extending from said air bag; and
a mechanism operatively connected to said housing and operable to selectively retain said tether, said mechanism including:
 a movable member selectively movable from a first position to a second position and at least partially defining a pressurizable chamber;
 a piston housing defining a slot and at least partially defining said pressurizable chamber, said movable member blocking said slot when in said first position and unblocking said slot when in said second position;
 an actuator operable to selectively release actuation fluid into said pressurizable chamber, thereby pressurizing said pressurizable chamber to move said movable member from said first position to said second position to unblock said slot, and wherein actuation fluid flows through said slot when said slot is unblocked;

wherein said tether is disposed adjacent said slot, such that actuation fluid flows through said slot to damage said tether, thereby breaking said tether to detach said tether from said mechanism when said movable member is in said second position, said air bag being inflatable to a first profile when said mechanism retains said tether and to a second profile when said tether is detached from said mechanism.

* * * * *